(No Model.)
H. M. BOIES.
CAR WHEEL.
No. 453,876. Patented June 9, 1891.
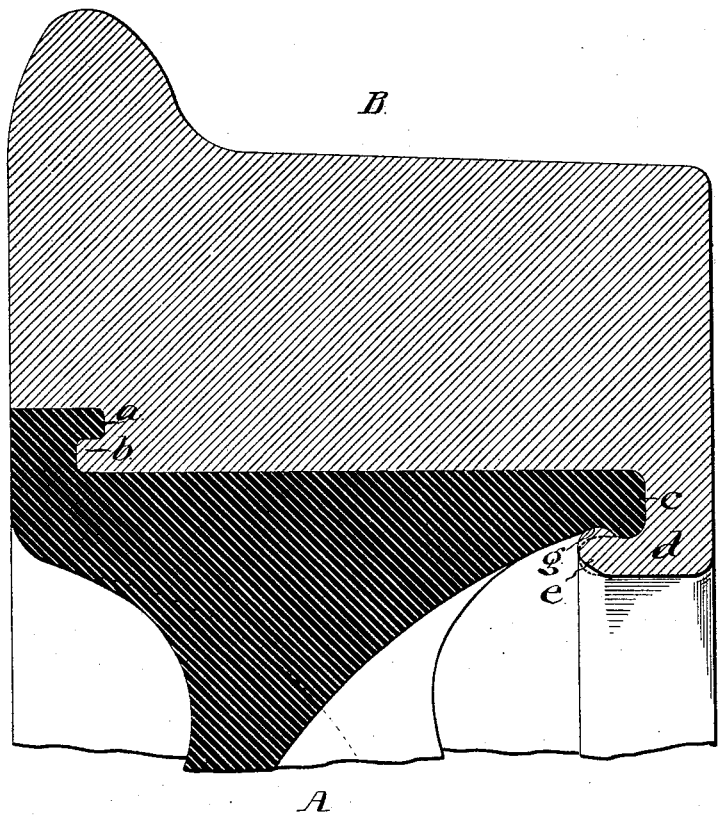
WITNESSES:
James H. Bell
A. E. Paige
INVENTOR
Henry M. Boies
By Hollingsworth & Meny
Attorneys

UNITED STATES PATENT OFFICE.

HENRY M. BOIES, OF SCRANTON, PENNSYLVANIA.

CAR-WHEEL.

SPECIFICATION forming part of Letters Patent No. 453,876, dated June 9, 1891.

Application filed November 1, 1890. Serial No. 370,085. (No model.)

*To all whom it may concern:*

Be it known that I, HENRY M. BOIES, of the city of Scranton, county of Lackawanna, and State of Pennsylvania, have invented certain new and useful Improvements in Car-Wheels, whereof the following is a specification, reference being had to the accompanying drawing.

My invention relates to a device for fastening the tire of a composite wheel to its center without the use of bolts. The accompanying drawing is a radial section of the tire and a portion of the center of a car-wheel, showing the means employed by me for joining the two together.

In the drawing the tire is designated by the letter B and the center by the letter A. The contiguous surfaces of the center and the tire toward the inner side of the wheel are formed with a corresponding step and overhanging flange upon each, the overhanging flange of the center being lettered *a* and that of the tire *b*. Toward the outside of the wheel the periphery of the center terminates in a rim *c*, and the corresponding portion of the tire has an inwardly-projecting step *d*, with overhanging flange *e*, forming a groove into which the rim *c* projects. The parts thus far described effectually prevent the tire from slipping off to the inside of the wheel, and also prevent any portion which may be broken off from the rest from flying off radially.

In order to prevent the tire from slipping off to the outside of the wheel, I form the groove or recess *g* upon the side of the rim *c* toward the center of the wheel, and into this groove or recess the overhanging flange *e* of the tire is swaged, or hammered, or rolled, or pressed after the tire has been put in its proper place on the center. The dotted line indicates the position of the overhanging flange *e* before swaging and the shaded portion its position after swaging. By this means of fastening the tire to the center I avoid the use of bolts, retaining-rings, or any other third part or parts, and thereby obtain the greatest durability and strength combined with the utmost simplicity of structure.

In place of the steps toward the inside of the wheel with the overhanging flanges *a* and *b* any of the common methods by which the tire may be secured on that side of the center, so long as it remains in its proper place, may be employed, although I prefer the construction shown in the drawing.

The overhanging flanges on the inner and outer edges of the center and tire are not in themselves new; nor is it new to make use of swaging in order to prevent the slipping off of the tire to the outside of the wheel.

By the use of my device when the tire is worn out and must be renewed the swaged part of the worn-out tire is cut and the center removed intact. This is a great improvement over prior devices in which a part of the center is swaged into a recess or groove in the tire, which necessitates cutting off part of the center in order to remove the tire, after doing which once or twice the center is ruined for the purpose of renewal.

Having thus described my invention, I claim—

1. In a composite wheel, the combination of fastenings which prevent the tire from slipping toward the outside, the rim *c* of the center, having near its outside face the groove *g*, and the step *d* upon the outside face of the tire, with the overhanging flange *e*, which is swaged into said groove *g*, substantially as described.

2. In a composite wheel, the combination of the overhanging flange *a* upon the center, interlocking with the overhanging flange *b* upon the tire, the rim *c* of the center having near its outside face the groove *g*, and the step *d* upon the outside face of the tire, with the overhanging flange *e*, which is swaged into said groove *g*, substantially as described.

HENRY M. BOIES.

Witnesses:
L. M. HORTON,
S. H. KINGSBURY.